(12) United States Patent
Calkins et al.

(10) Patent No.: US 7,281,543 B2
(45) Date of Patent: Oct. 16, 2007

(54) APPARATUS, SYSTEMS AND METHODS FOR PLUGGING A HIGH TEMPERATURE PIPE

(76) Inventors: Charles D. Calkins, 6626 S. 76th East Ave., Tulsa, OK (US) 74133; Eric N. Freeman, 15772 S. 81st West Ave., Sapulpa, OK (US) 74066; Tony R. Garrison, 15707 S. Braden, Bixby, OK (US) 74008; Gary D. Goins, 8701 E. 98th Pl., Tulsa, OK (US) 74133; Phillip K. Morrison, 3824 S. Sequoia Ave., Broken Arrow, OK (US) 74011; Gregory L. Puckett, 2619 S. 137th East Ave., Tulsa, OK (US) 74134; Stephen M. Jacob, 11008 Highway 961, Clinton, LA (US) 70722; Bryan W. McDonald, 1914 Windy Green, Kingwood, TX (US) 77345; Jack E. Miller, 14107 Tiff Trail, Houston, TX (US) 77095

( * ) Notice: Subject to any disclaimer, the term of this patent is extended or adjusted under 35 U.S.C. 154(b) by 162 days.

(21) Appl. No.: 10/554,134

(22) PCT Filed: Apr. 30, 2004

(86) PCT No.: PCT/US2004/013686

§ 371 (c)(1),
(2), (4) Date: Oct. 20, 2005

(87) PCT Pub. No.: WO2004/099661

PCT Pub. Date: Nov. 18, 2004

(65) Prior Publication Data

US 2006/0243326 A1 Nov. 2, 2006

Related U.S. Application Data

(60) Provisional application No. 60/467,467, filed on May 2, 2003.

(51) Int. Cl.
*F16L 55/18* (2006.01)
(52) U.S. Cl. .................. 137/15.12; 137/317; 137/318; 138/94; 138/97

(58) Field of Classification Search ............. 137/15.12, 137/15.14, 317–319; 138/94, 97
See application file for complete search history.

(56) References Cited

U.S. PATENT DOCUMENTS

| 3,170,226 | A | | 2/1965 | Allan |
| 3,785,041 | A | | 1/1974 | Smith |
| 5,690,139 | A | * | 11/1997 | Murphy et al. ............. 137/317 |
| 6,745,791 | B2 | * | 6/2004 | Beals et al. ................. 137/317 |

FOREIGN PATENT DOCUMENTS

| EP | 0069551 | 1/1983 |
| GB | 1064398 | 4/1967 |

OTHER PUBLICATIONS

Intl Search Rep, Jul. 23, 2004.
Written Opinion, Jul. 23, 2004.
Search Report, Oct. 10, 2006, Singapore Patent.
Exam Report, Nov. 27, 2006, European Patent.

* cited by examiner

*Primary Examiner*—Kevin Lee
(74) *Attorney, Agent, or Firm*—Gable Gotwals

(57) ABSTRACT

A method of plugging a pipeline includes the steps of welding onto the exterior of the pipeline (10) first (12) and second (14) spaced apart collars, each having a sealing face (26,26A) in a plane perpendicular the pipeline (10) axis. A containment housing (34,36) is affixed by welding to the collars (12,14) to fully encompass a section of the pipeline (10) between the collars (12,14). A tapping (60) machine is then removably attached to an open top of the containment housing (34). Using the tapping machine (60) a short length of the pipeline (10) is cut and removed from between the collars (12,14) leaving two open exposed pipe ends (78,80). First and second seal elements (92,94) are positioned between the collars (12,14), Each having a forward sealing face. The seal elements (92,94) are forced apart from each other into sealing engagement with the collar sealing faces thereby closing the open, exposed ends (78,80) of the pipe (10).

16 Claims, 9 Drawing Sheets

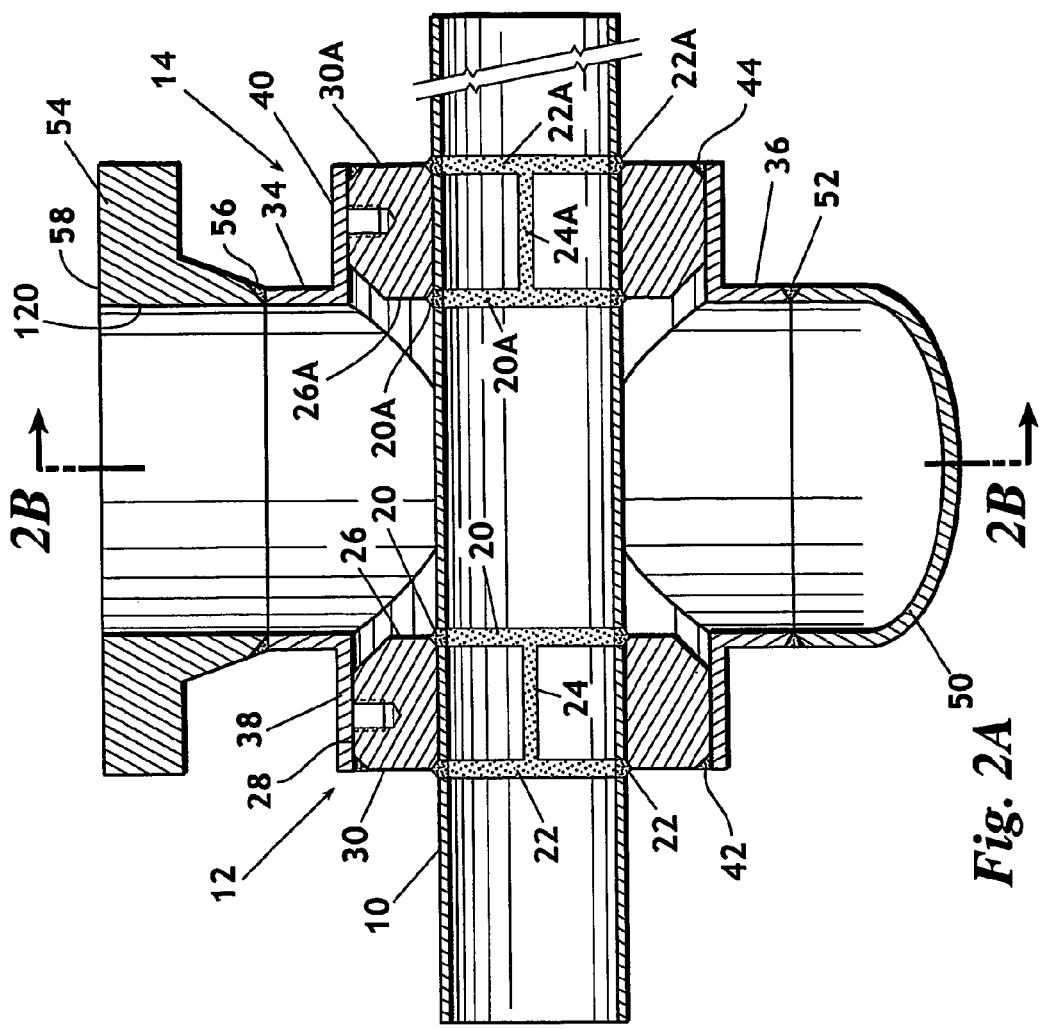
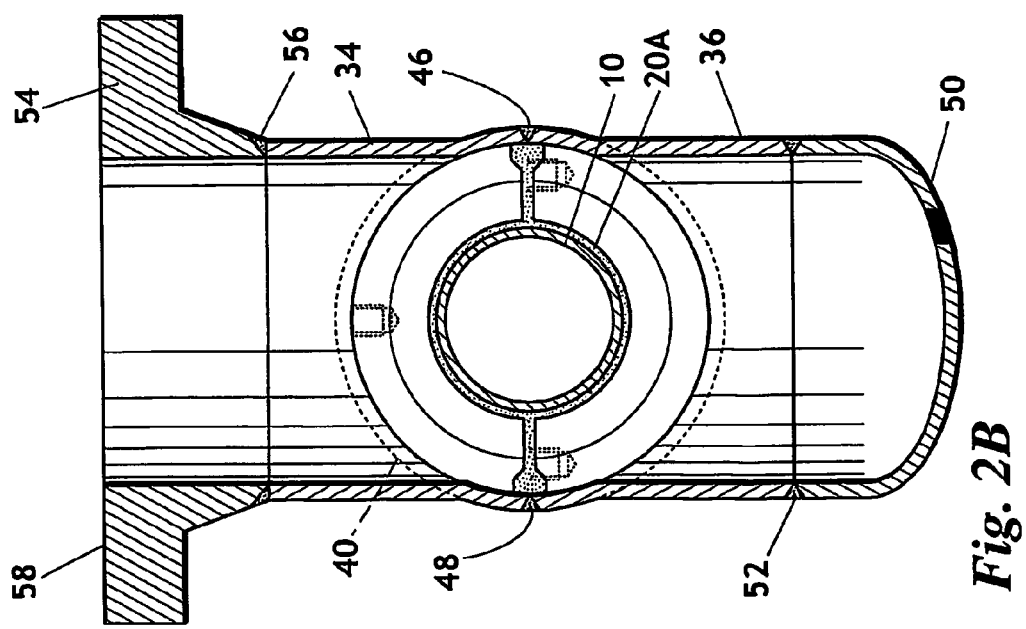

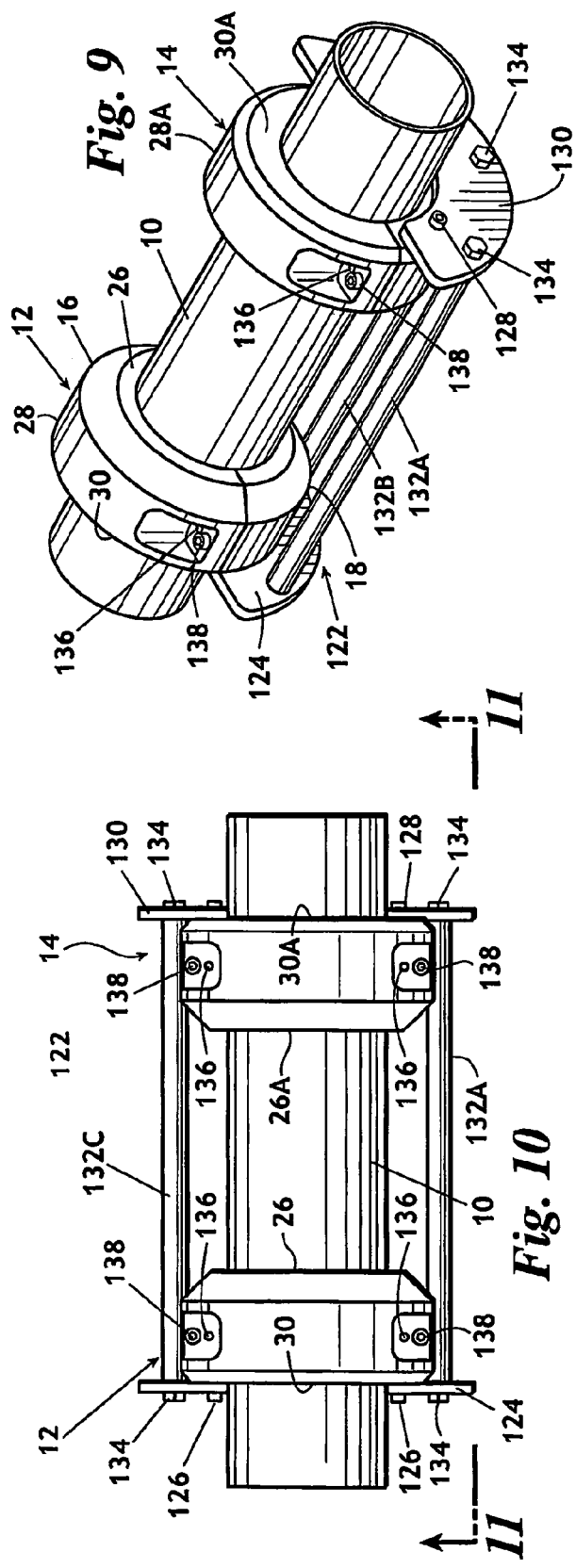
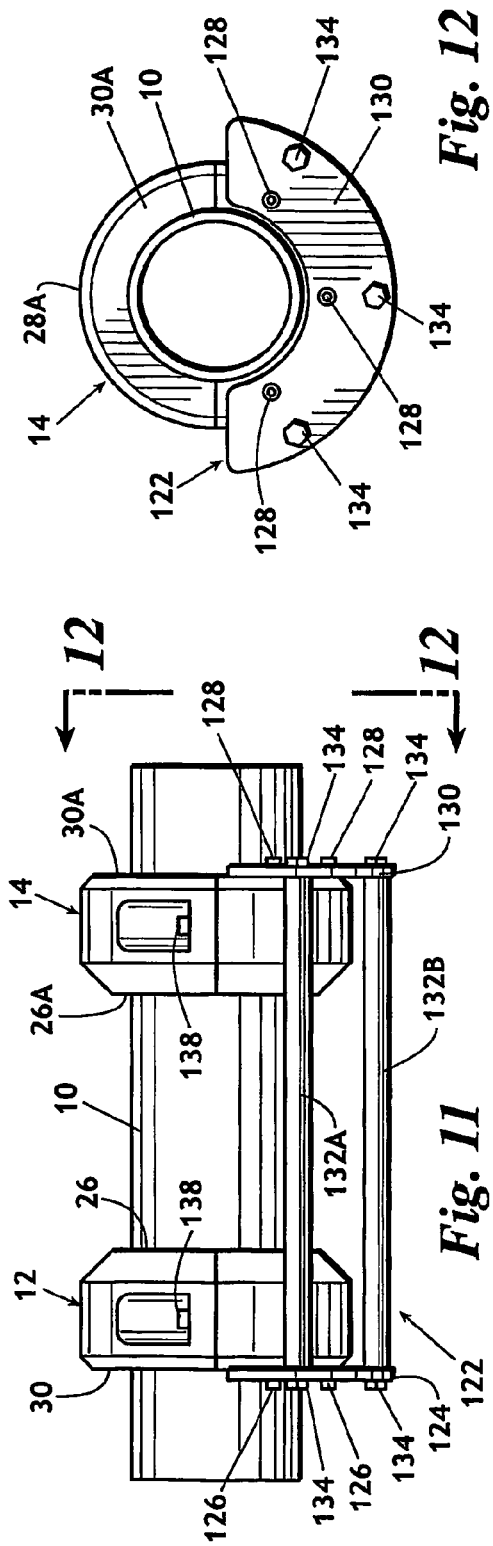

APPARATUS, SYSTEMS AND METHODS FOR PLUGGING A HIGH TEMPERATURE PIPE

REFERENCE TO PENDING APPLICATIONS

This application is based upon U.S. Patent Provisional Application Ser. No. 60/467,467 filed 2 May 2003.

REFERENCE TO MICROFICHE APPENDIX

This application is not referenced in any microfiche appendix.

BACKGROUND OF THE INVENTION

This invention relates to an apparatus, systems and methods for plugging a pipe under pressure, and is particularly applicable for plugging a pipe, or pipeline having therein high temperature liquids or gases. "Pipe" as used hereinafter is inclusive of any tubular member made of metal for carrying fluid (liquid or gas).

Machines for tapping an opening in a pipe are well-known. Prior issued U.S. patents for tapping machines include U.S. Pat. No. 3,614,252 entitled TAPPING APPARATUS; U.S. Pat. No. 4,579,484 entitled UNDER WATER TAPPING MACHINE; U.S. Pat. No. 4,880,028 entitled COMPLETION MACHINES; U.S. Pat. No. 5,439,331 entitled HIGH PRESSURE TAPPING APPARATUS; U.S. Pat. No. 5,612,499 entitled METHOD OF INSERTING A SENSOR INTO A PIPELINE and U.S. Pat. No. 6,012,878 entitled PRESSURE BALANCED SUBSEA TAPPING MACHINE.

Tapping machines, such as the kind described in the above-mentioned U.S. patents, are for tapping a hole in a pipe while liquids or gases are flowing through them—that is, while the pipe is under pressure. Tapping procedures of this type are customarily carried out primarily for one of two purposes—that is, to provide a branch fitting on the pipe or to enable fluid flow through the pipe to be blocked. Other examples of prior art that describe and illustrate plugging the interior of a pipe usually associated with first tapping the pipe, include the following United States patents:

| PATENT NO. | INVENTOR | TITLE |
| --- | --- | --- |
| 3,599,663 | Freeman | Hot Tapping Apparatus |
| 3,626,475 | Hicks | High Temperature Pipe-Plugging Apparatus |
| 3,665,966 | Ver Nooy | Pipe Plugger |
| 3,872,880 | Ver Nooy et al. | Plugging Apparatus |
| 4,411,459 | Ver Nooy | Branch Fitting for Providing Access to the Interior of a Pipe |
| 5,443,095 | Glossop, Jr. | Fluid Blocking Device |
| 5,531,250 | Freeman et al. | Device for Plugging the Interior of a Pipe |

Tapping a pipe normally involves the use of a circular saw, examples of which are illustrated and described in the following United States patents:

| PATENT NO. | INVENTOR | TITLE |
| --- | --- | --- |
| 5,360,300 | Sullivan | Cutter Shell |
| 5,451,128 | Hattersley | Cutter Tool Having Removable Teeth |
| 5,466,099 | Sullivan et al. | Cutter Shell for Forming Holes of Improved Cylindricality |

Devices for plugging a pipe that has been tapped are also well-known as illustrated by U.S. Pat. No. 5,531,250 entitled DEVICE FOR PLUGGING THE INTERIOR OF A PIPE.

These patents are incorporated herein by reference since they provide a thorough background relating to the subject matter of the present invention.

BRIEF SUMMARY OF THE INVENTION

The typical tapping machine is formed of a body, which is elongated and tubular. The body has a rotating boring bar therein. The lower end of the body is provided with means, such as a flange, by which it is secured to a fitting attached to a pipe. A gearbox or drive mechanism is affixed to the upper end of the tapping machine body and provides means for rotation of the boring bar. The lower end of the boring bar is equipped to receive a cutter. Rotative energy, such as provided by a hydraulic motor, is supplied to the gearbox or drive mechanism and this rotative force in turn is applied to rotate the boring bar.

In addition to the boring bar, the typical tapping machine has a feed screw for moving the boring bar axially when the boring bar is rotated relative to the feed screw. A drive sleeve rotates the boring bar to provide such relative rotation and to rotate the cutter attached to the boring bar to cause the cutter to cut a hole in a pipe. The boring bar may have either a fixed or variable feed rate depending upon the design of the tapping machine.

The present invention utilizes a tapping machine that is essentially of the previously known types as illustrated in the above-mentioned U.S. patents.

The method of this invention includes the following basic steps:

(1) Welding onto a pipe having fluid flow therethrough a pair of collars. Each of the collars is a toroid that is severed to provide two toroid halves that are fitted around the pipe. Each collar set will either be machined and lapped to provide a planar sealing surface or be prepared for field machining and grinding after welding to the pipeline. When fitted together each of the collars provides a planar forward face. The forward faces of the two collars are parallel to each other and spaced apart an accurately established distance. The two collars are affixed to the exterior of the pipe by welding. With the two halves of each collar held on the exterior surface of the pipe, a first weld is formed circumferentially around the pipe where the rearward face of the collar meets the pipe. In like manner, the two halves of each collar are circumferentially welded where the forward face meets the pipe around the full 360° circumference of the pipe. The two halves of the collars are then welded to each other. The weld in the forward surface of each collar may be specifically configured to achieve deep penetration for reasons to be explained subsequently.

(2) For collars welded in the inner faces, after the two collars are welded to the exterior of the pipe, the forward faces are machined and ground to provide an uninterrupted circumferential planar-sealing surface on each collar. These circumferential sealing surfaces are parallel to each other and in radial planes perpendicular to the longitudinal axis of the pipe.

(3) After the collars have been welded onto the pipe and optionally the forward sealing surfaces machined, and ground or polished to provide uninterrupted circumferential sealing surfaces, containment housing fittings are welded to the collars to provide a housing of internal dimensions greater than the external diameter of the pipe. The containment housing has a bottom cup-shaped member. A flanged fitting forms the upper end of the containment housing.

(4) After the containment housing has been welded to the collars and provided with an upper flange the welded integrity of the collars and the containment housing can be pressure tested to insure that there are no leaks and that the collars and containment housing have the structural integrity to contain the maximum pressures to which it will be subjected.

(5) After the collars and the attached containment housing have been installed and tested a valve is secured to the containment housing flange. A tapping machine system, well-known in the industry and illustrated and described in the above-mentioned patents, is secured to an upper surface of the valve. Most of the above described tapping machine patents illustrate the arrangement wherein the hole cut into a pipe is equal to the internal diameter of the pipe, however, in practicing the present invention it is desirable that instead of tapping only a hole in the pipe sidewall, a complete section of the pipeline is removed. Removal of a complete section rather than tapping only a hole in a pipe is illustrated in U.S. Pat. No. 5,612,499 entitled METHOD OF INSERTING A SENSOR INTO A PIPELINE. This patent shows the concept of securing a containment housing to the exterior of a pipe before severing the pipeline but does not show the unique concepts of the present invention, which includes the use of a first and a second spaced-apart collar, each collar having a planar sealing face. When a section of a pipe has been cut by use of a circular cutter, such as is shown in FIG. 4 of U.S. Pat. No. 5,612,499, it is important that the section be removed from within the containment housing which can be achieved by the use of a pilot drill having a coupon capture mechanism.

(6) The next step in the system and method of the invention is to seal the opposed ends of the severed pipe. For this purpose, a sealing tool is inserted into the interior of the containment housing. The sealing tool contains opposed primary and secondary sealing elements. Each sealing element is a cup-shaped member having a circumferential sealing surface of internal diameter greater than the external diameter of the pipe. The sealing assembly is lowered into the containment housing and actuated such that the opposed sealing elements are advanced in the direction towards the open ends of the severed pipe and in directions towards the opposed planar circumferential sealing surfaces provided by the collars.

(7) After the sealing elements are correctly positioned, a wedge member is forced by the plugging machine into position between the opposed sealing elements to force them into sealing engagement with the collar planar sealing surfaces. In this way metal-to-metal seals may be obtained, closing both ends of the severed pipe. Sealing is achieved by forcing the circumferential sealing surface of the sealing elements against the sealing surfaces of the collars.

(8) At this stage in the process, both of the severed ends of the pipe are closed with seals which may be metal-to-metal. The effectiveness of the sealing action can be verified by testing pressures within the containment housing.

(9) After the effectiveness of the seals has been verified, repairs or modifications can take place with respect to the pipe in sections isolated from pressure. In some instances, this may require the use of two containment housings and sealing mechanisms to isolate a section of pipe from fluid pressure.

(10) After the actions that require the complete cessation of fluid flow through the pipe have been completed, the wedge that holds the seal elements in position against the planar sealing faces of the collars can be removed followed by retracting the seal elements from within the interior of the containment housing.

(11) After the sealing tools have been removed a plug may be installed in the containment housing flange, fitting for permitting the valve to be removed. Then the containment housing may be fully closed such as by affixing a closure plate to the flange. The pipeline is thus restored to its normal use.

A better understanding of the invention will be obtained from the following detailed description of the preferred embodiments and claims taken in conjunction with the following drawings.

BRIEF DESCRIPTION OF THE DRAWINGS AND ILLUSTRATIONS

FIG. 1A illustrates a length of pipe such as a pipe used in a refinery or a portion of a pipeline for carrying fluids—that is, liquids or gases under pressure and particularly a pipe that carries fluids at a high temperature. While the invention is not limited for use in applications that have high temperature it is particularly applicable to high temperature applications since an essential uniqueness of the invention is a method of providing metal-to-metal seals to contain fluids at temperatures where elastomeric seals are not feasible. FIG. 1A shows, a pair of collars welded to the exterior of the pipe. Each of the collars is formed of two halves assembled and welded around the exterior of the pipe.

FIG. 1B is an end view as taken along the line 1B-1B of FIG. 1A and shows the inner face of one of the collars and shows how the two halves of the collar are welded together and particularly shows that on the inner face welding may be carried out in a manner that will provide an uninterrupted circumferential sealing surface after the sealing surface of each of the collars is machined and ground. Alternatively, the two halves of the collars can be bolted or otherwise fastened together achieving a metal-to-metal seal between the two halves and then welded to the pipe and to each other everywhere except along the sealing faces. This method would avoid the necessity to machine and grind the collar sealing surfaces in the field.

FIG. 1C is an end view as taken along the line 1C-1C of FIG. 1A and shows the outer face of the collars and shows how the two halves of the collar are welded together at the split and particularly shows that on the outer face welding is carried out in a manner to assure the split area of each of the collars is sealed from internal pressure escaping outside of the collar.

FIG. 2A is an external cross-sectional view of the length of pipe as in FIG. 1 with collars affixed thereto and shows a containment housing secured to the collars. The containment housing has a closed cup-shaped lower end and a flange at the upper end. The flange has a face that is parallel to the longitudinal axis of the pipe.

FIG. 2B is a cross-sectional view of the containment housing and flange as taken along the line 2B-2B of FIG. 2A.

Figure 7:
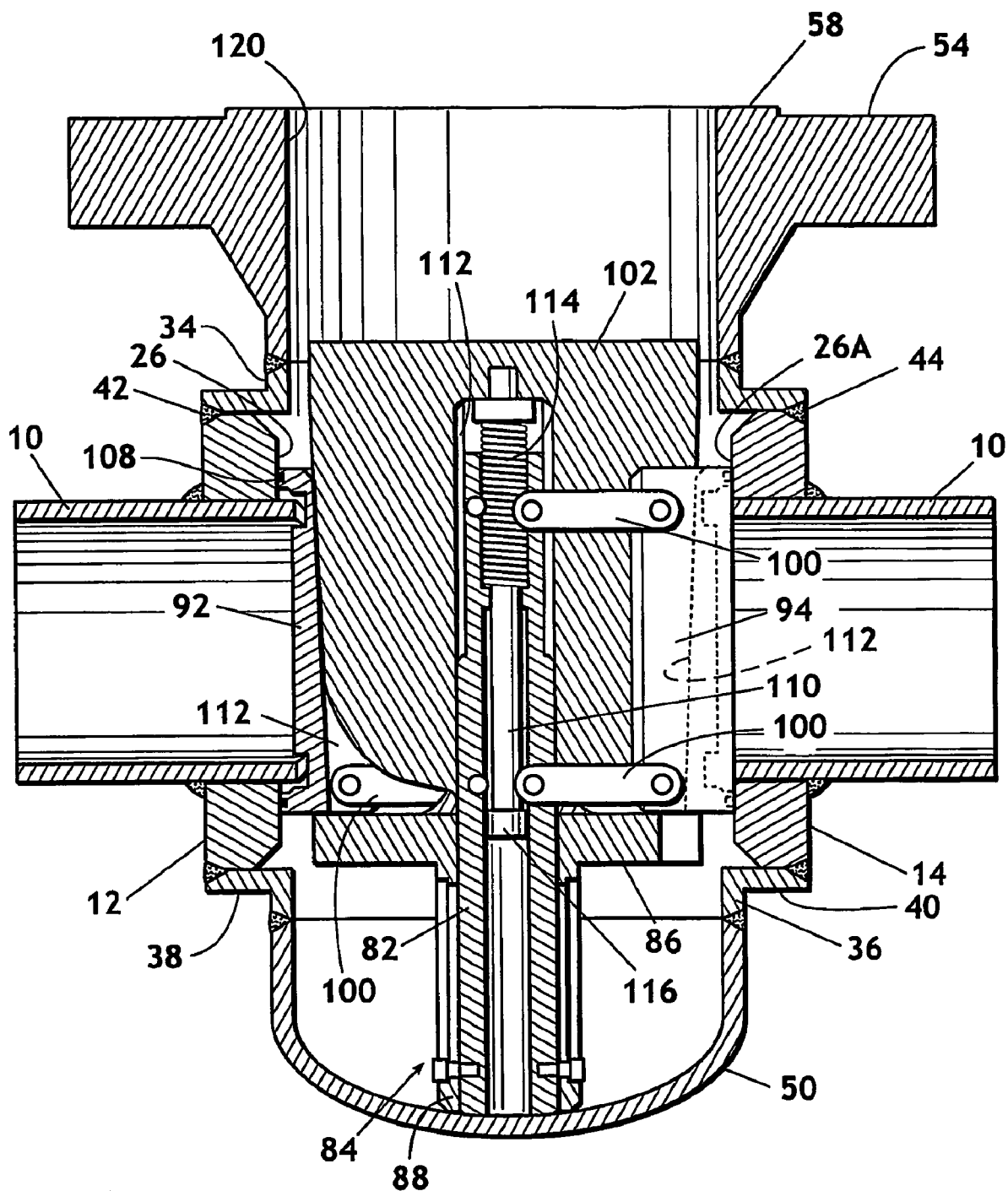

FIG. 7 shows a wedge having been moved downwardly to force against the sealing elements to move them into sealing metal-to-metal contact with the opposed faces of the collars. FIG. 7 shows both of the exposed ends of the pipe closed to thereby permit repairs, maintenance or other operation on the pipe. When closure of the pipe is no longer required, the sealing system is withdrawn by first withdrawing the wedge and then withdrawing the sealing elements.

Figure 8:
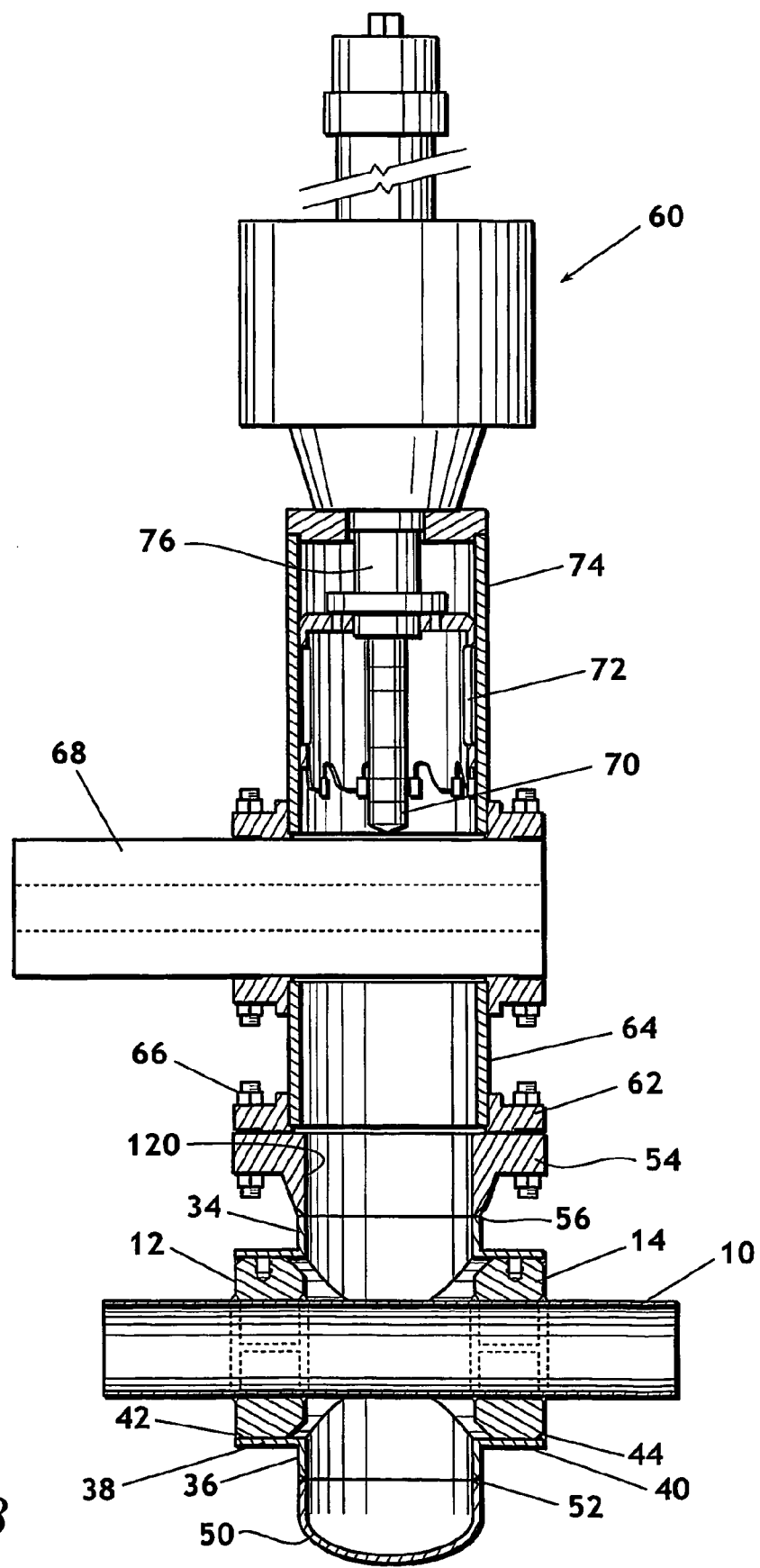

FIG. 8 illustrates a rudimentary tapping system affixed to the pipe with collars and a containment housing as in FIG. 2A. The tapping system is illustrative of the type of machine that is used in carrying out the method of this invention and specifically, FIG. 8 shows the tapping system ready to cut out a length of pipe 10 from between the collars to produce the arrangement shown in FIG. 3.

Figure 1A:
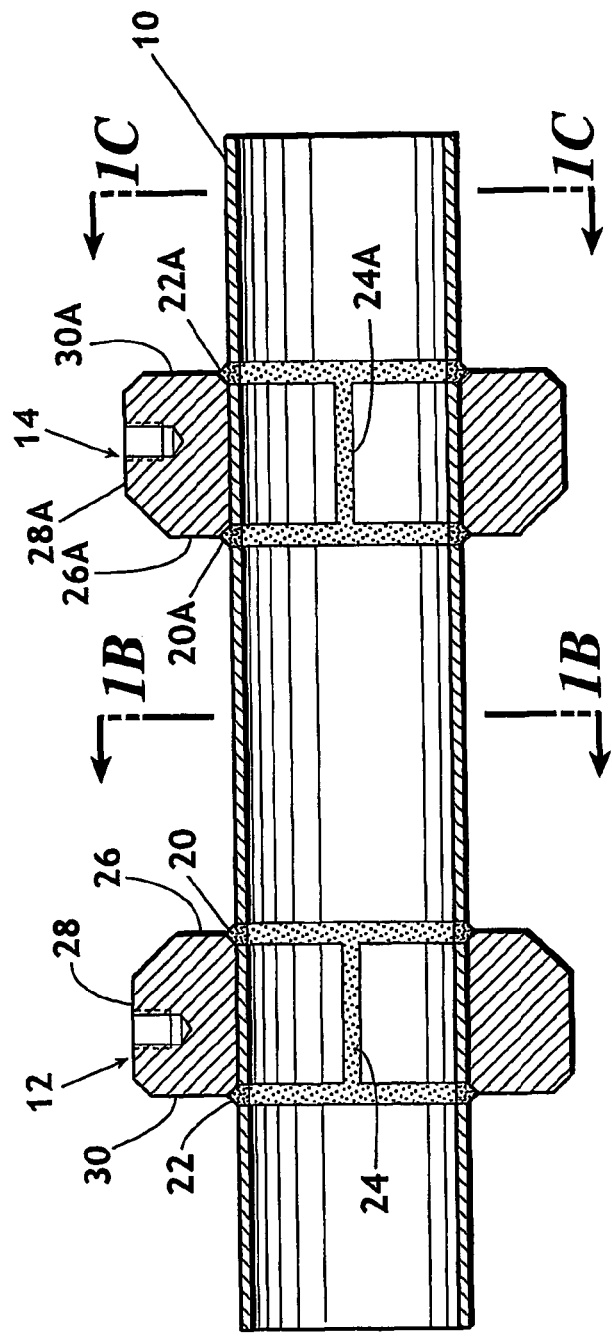

FIG. 9 is an isometric view of a short length of the pipe as shown in FIG. 1A and showing the use of an alignment fixture for accurate positioning of the collars prior to welding the collars to the pipe.

FIG. 10 is a top view of the alignment fixture, collars, and pipe shown in FIG. 9.

FIG. 11 is an elevational side view of the alignment fixture and collars as taken long the line 11-11 of FIG. 10.

FIG. 12 is an end view of the alignment fixture and one end of a collar, with the pipe shown in cross-section, as taken along the line 12-12 of FIG. 10.

Elements illustrated in the drawings are identified by the indicated numbers on the following sheet.

| Element Numbers | |
|---|---|
| ELEMENT NO. | DESCRIPTION |
| 10 | Pipeline |
| 12 | First Collar |
| 14 | Second Collar |
| 16 | Upper Half of Collar 12 |
| 18 | Lower Half of Collar 12 |
| 20 | Inner Circumferential Weld |
| 22 | Outer Circumferential Weld |
| 24 | Third Weld |
| 26 | Inner Face of Collar 12 |
| 26A | Inner Face of Collar 14 |
| 28 | External Cylindrical Surface |
| 30 | Outer Face of Collar 12 |
| 32 | Fourth Weld |
| 34 | Upper Containment Housing Portion |
| 36 | Lower Containment Housing Portion |
| 38 | Tubular Extension |

-continued

| Element Numbers | |
|---|---|
| ELEMENT NO. | DESCRIPTION |
| 40 | Tubular Extension |
| 42 | Circumferential Weld |
| 44 | Circumferential Weld |
| 46 | Horizontal Weld |
| 48 | Horizontal Weld |
| 50 | End Cap |
| 52 | Circumferential Weld |
| 54 | Flange |
| 56 | Horizontal Weld |
| 58 | Planar Surface |
| 60 | Tapping Machine |
| 62 | Flange |
| 64 | Adapter |
| 66 | Bolts |
| 68 | Sandwich Valve |
| 70 | Pilot Bit |
| 72 | Cylindrical Cutter |
| 74 | Tubular Body |
| 76 | Boring Bar |
| 78 | End Surface |
| 80 | End Surface |
| 82 | Tubular Body |
| 84 | Platform Member |
| 86 | Platform |
| 88 | Tubular Portion |
| 90 | Frusto-Conical Portion |
| 92 | First Seal Element |
| 94 | Second Seal Element |
| 96 | Circumferential Lip |
| 98 | Circumferential Lip |
| 100 | Link Arms |
| 102 | Wedge |
| 104 | Cam Surface |
| 106 | Cam Surface |
| 108 | Circular Ring |
| 110 | Rod |
| 112 | Slot |
| 114 | Spring |
| 116 | Head |
| 118 | Internal Flange |
| 120 | Passageway |
| 122 | Alignment Fixture |
| 124 | First End Plate |
| 126 | Bolts |
| 128 | Bolts |
| 130 | Second End Plate |
| 132 | A, B & C Rods |
| 134 | Bolts |
| 136 | Drive Lock Pins |
| 138 | Bolts |

DETAILED DESCRIPTION OF THE PREFERRED EMBODIMENTS

Figure 1C:
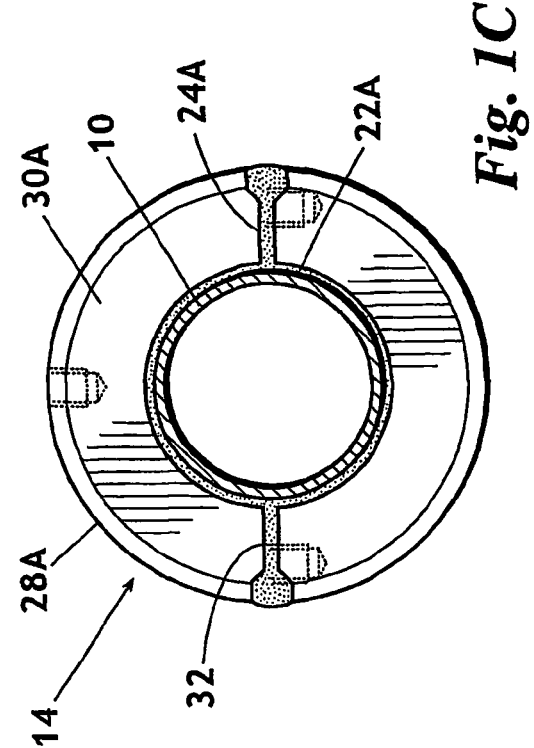
Figure 1B:
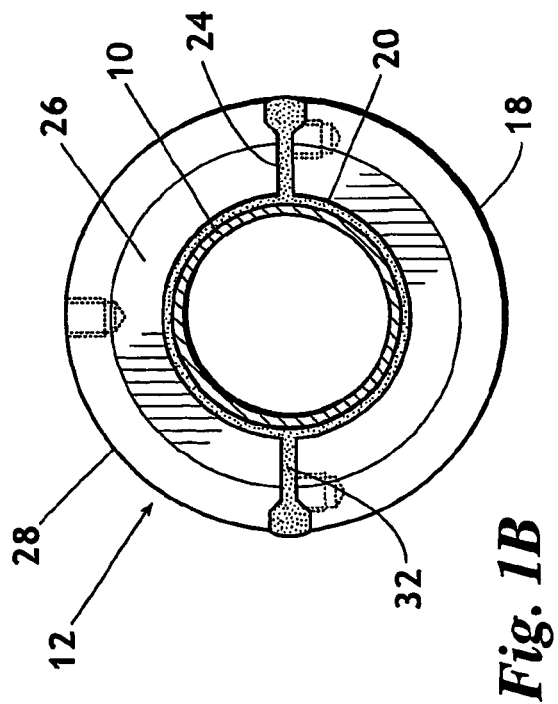

Referring first to FIGS. 1A, 1B, and 1C, a length of pipe, which may be a portion of pipeline, is identified by the numeral 10. While the invention is not specifically limited to the temperature of the fluid flow through pipe 10, nevertheless, the invention is particularly applicable to the situation in which pipe 10 carries a high temperature liquid or gas. Most specifically, the invention is related to conditions in which the temperature of the liquid or gases flowing through pipe 10 are such that the use of elastomeric seals is not practical.

FIG. 1A illustrates a location along pipe 10 where it is desired to close off fluid flow through the pipe, such as for purposes of repairing or replacing a downstream length of the pipe or a piece of equipment such as a valve that is in a downstream location relative to the portion of the pipe 10 as shown in FIG. 1A.

The first step in practicing the system and method of this invention is to apply a first collar generally indicated by the numeral 12 to the exterior of pipe 10 and a spaced apart second collar 14. Each of the collars 12 and 14 are made up of two pieces. Each of the collars is geometrically shaped as a toroid and each of the pieces is a semi-toroid. FIG. 1B illustrates the first collar 12 being formed of an upper half 16 and a lower half 18. The collar halves 16 and 18 are positioned on the pipe 10 and the collar halves then welded to the pipe and welded to each other. The welds include an inner circumferential weld 20 and an outer circumferential weld 22. The circumferential welds extend around the full interior of the toroidal collar 12 and around the full external circumferential surface of pipe 10.

For collars welded in the inner faces, a third weld 32 joins the end surfaces of the collar halves to each other. This third weld extends along the inner face 26 of collar 12, along the external cylindrical surface 28 of collar 12 and along the outer face 30. A fourth weld 24 joins the opposite ends of each of the toroidal halves of collar 12.

In those instances where the sealing face 26 will be field machined, for reasons that will be described subsequently, it is important that the fourth weld 24 penetrates the first collar inner surface 26 to a distance below the collar inner surface. Alternatively, if no field welding is performed, the fourth weld number 24 will be applied only to the outer collar surfaces at the split as shown in FIG. 1C.

With the use of a specially designed alignment fixture cradle for accurately positioning collar 14 relative to collar 12 and to the pipe 10, as is described subsequently with reference to FIGS. 9 through 12, collar 14 is welded onto the exterior of pipe 10 using the same welds as those required to attach collar 12 and the welds identified by the same numbers with the addition of the letter A.

When the sequence of steps as has been described are completed, the significant achievement is the provision of spaced-apart paralleled inner faces 26 and 26A. These inner faces become circumferential sealing faces of the system.

The next step in the method of this invention, when required, is to carefully machine and grind the sealing faces 26 and 26A of the collars. This can be accomplished by utilizing pipe 10 as an axis of rotation for a grinding and polishing machine that is not illustrated but that has facilities for shaping, grinding and polishing front face 26 of first collar 12 and front face 26A of second collar 14. This grinding and polishing must be carefully accomplished to provide faces that have uninterrupted smooth circumferential sealing surfaces that are preferably parallel or at least substantially parallel to each other. The finished sealing surfaces 26 and 26A should be completed to within about $\frac{1}{16}^{th}$ inch of the exterior of pipe 10 so that the inner circumferential welds 20 and 20A retain their integrity.

After collars 12 and 14 are fixed and welded in place as described and the forward surfaces 26 and 26A machined, ground and/or polished as necessary to provide sealing surfaces, the next step of the invention is illustrated in FIGS. 2A and 2B. An upper containment housing portion 34 and a lower containment housing portion 36 are positioned on collars 12 and 14 and welded as indicated. When joined together, the upper and lower containment housing portions 34 and 36 provide a tubular extension 38 that surrounds collar 12 and an additional tubular extension 40 that surrounds collar 14. Tubular extension 38 is secured to collar 12 by a circumferential weld 42 and tubular extension 40 is secured to collar 14 by similar circumferential weld 44. The containment housing portions 34 and 36 are secured to each other by a pair of horizontal welds 46 and 48.

An end cap 50 is affixed to the containment-housing portion 36 by a circumferential weld 52.

The containment housing is completed by a flange 54. Flange 54 is a cast or machined item commonly used in piping systems. It is secured by a horizontal circumferential weld 56 to the upper containment-housing portion 34. Flange 54 has a horizontal planar sealing surface 58 and typically has openings (not shown) through the flange portion to receive bolts.

After the application of collars 12 and 14, containment housing upper and lower portions 34 and 36, end cap 50 and flange 54, the integrity of the welds can be pressure tested. To do this a flange plate (not shown) is secured to the upper end of flange 54 closing the flange surface 58. Fluid pressure can then be applied to the interior of the containment housing surrounding a portion of the length of pipe 10. If any leakage occurs through defective welding, the welding can be repaired so that, before further activities, the integrity of the collars and housing can be satisfied.

The next step in the method of this invention is illustrated in FIG. 8 wherein a rudimentary tapping machine is indicated generally by the numeral 60. By means of a bottom flange 62, an adapter 64 is attached to the flange 62 such as by bolts 66. Thereafter, a sandwich valve 68 or other type of valve is connected to the adapter. The tapping machine 60 is then secured to the top end of valve 68.

The tapping machine 60 includes a pilot bit 70 and a cylindrical cutter 72 that are contained within the tapping machine tubular body 74. The tapping machine includes a rotatable longitudinally extendable and retractable boring bar 76 by which cylindrical cutter 72 is rotatably extended and withdrawn.

Figure 3:
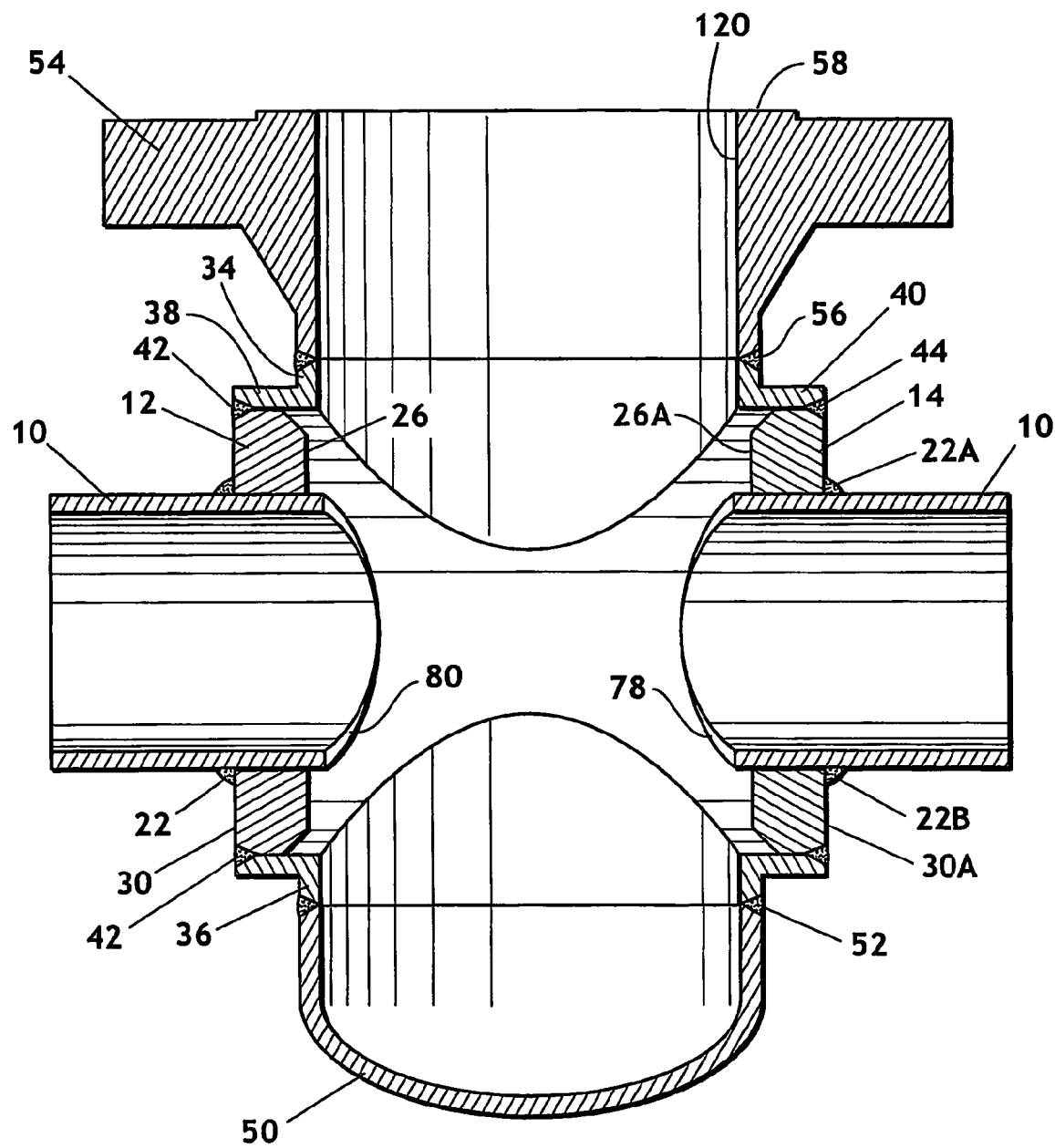
FIG. 3 shows the pipe having the collars and containment housing affixed thereto and shows the pipe having been severed by the use of a tapping machine.
Figure 4:
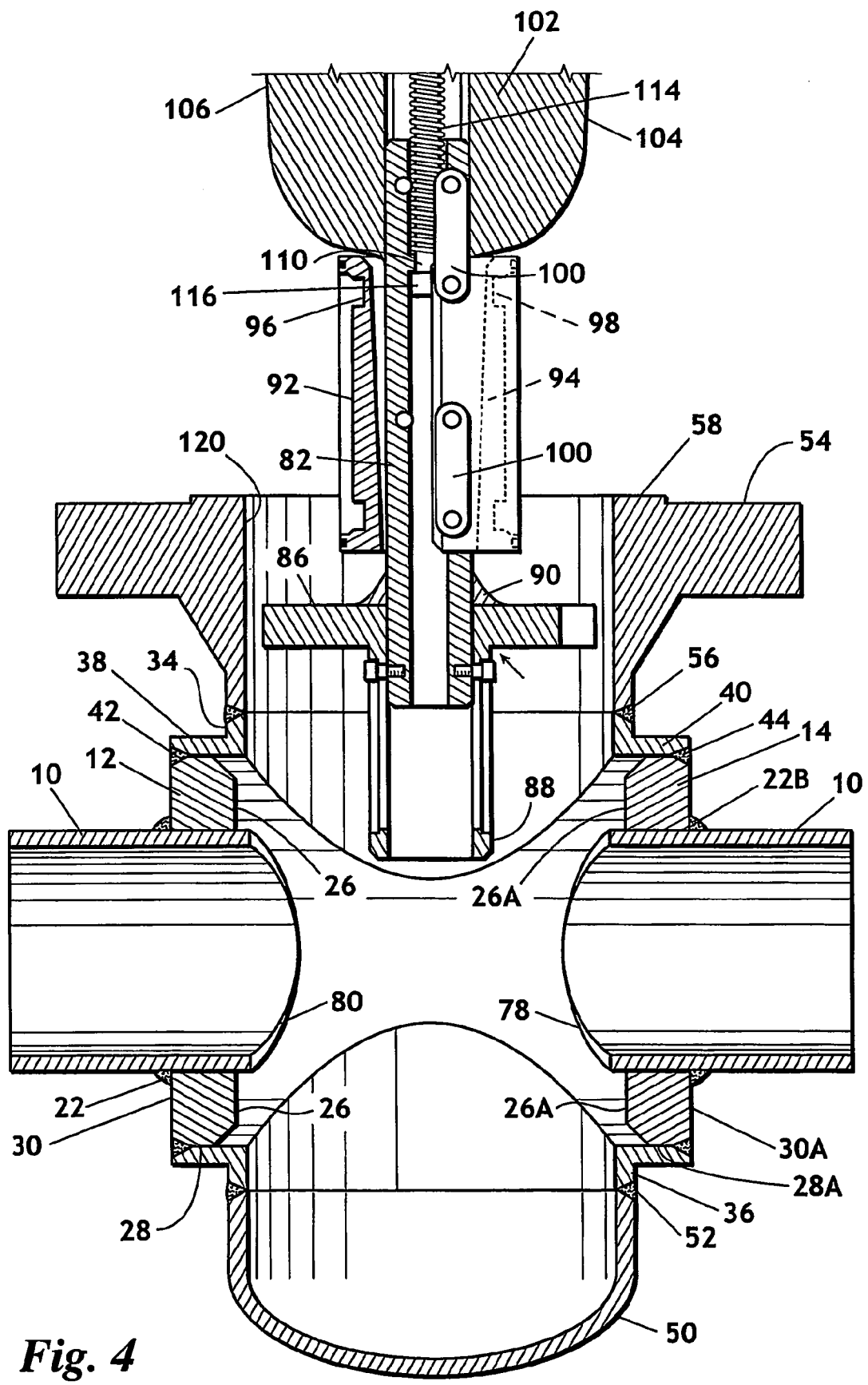
FIG. 4 shows the lower portion of a sealing system as it is extended into the containment housing.

Sandwich valve 68 is opened to permit cylindrical cutter 72 to be advanced by boring bar 76 to extend down through flange 54 and into the containment housing secured to collars 12 and 14. The boring bar is rotated and advanced so that cylindrical cutter 72 cuts through pipe 10. Pilot drill 70 first penetrates the pipe and functions as a guide for cylindrical cutter 72. Further, pilot drill 70 is constructed to provide for coupon retention. After a section of pipe 10 has been cut completely severing the section from the pipe, the boring bar is returned having the severed pipe section (not shown) attached to it to an area within tubular body 74 above sandwich valve 68. Sandwich valve is closed allowing the tapping machine 60 to be removed to permit retrieval and disposal of the severed portion of pipe 10. After pipe 10 has been cut through by cylindrical cutter 72, the containment housing, collars and pipe have the appearances as illustrated in FIG. 3 except that the flange 62, adapter 64 and sandwich valve 68 as shown in FIG. 8 remain in place as affixed to flange 54 although these elements are not shown in FIGS. 3-7. In this way, the interior of pipe 10 is constantly confined and contained.

Cylindrical cutter 72 as shown in FIG. 8 is of a diameter greater than the external diameter of pipe 10 so that when fully extended through the full diameter of pipe 10, the pipe is completely severed as illustrated in FIG. 3. The end surfaces 78 and 80 of pipe 10 are each semi-cylindrical—that is, they are not planar. Thus, the end surfaces 78 and 80 are not parallel to sealing surfaces 26 and 26A of collars 12 and 14. An important aspect of the present invention is that end surfaces 78 and 80 of pipe 10 are not employed in the plugging system of this invention and are not used in closing off flow through pipe 10.

Figure 5:
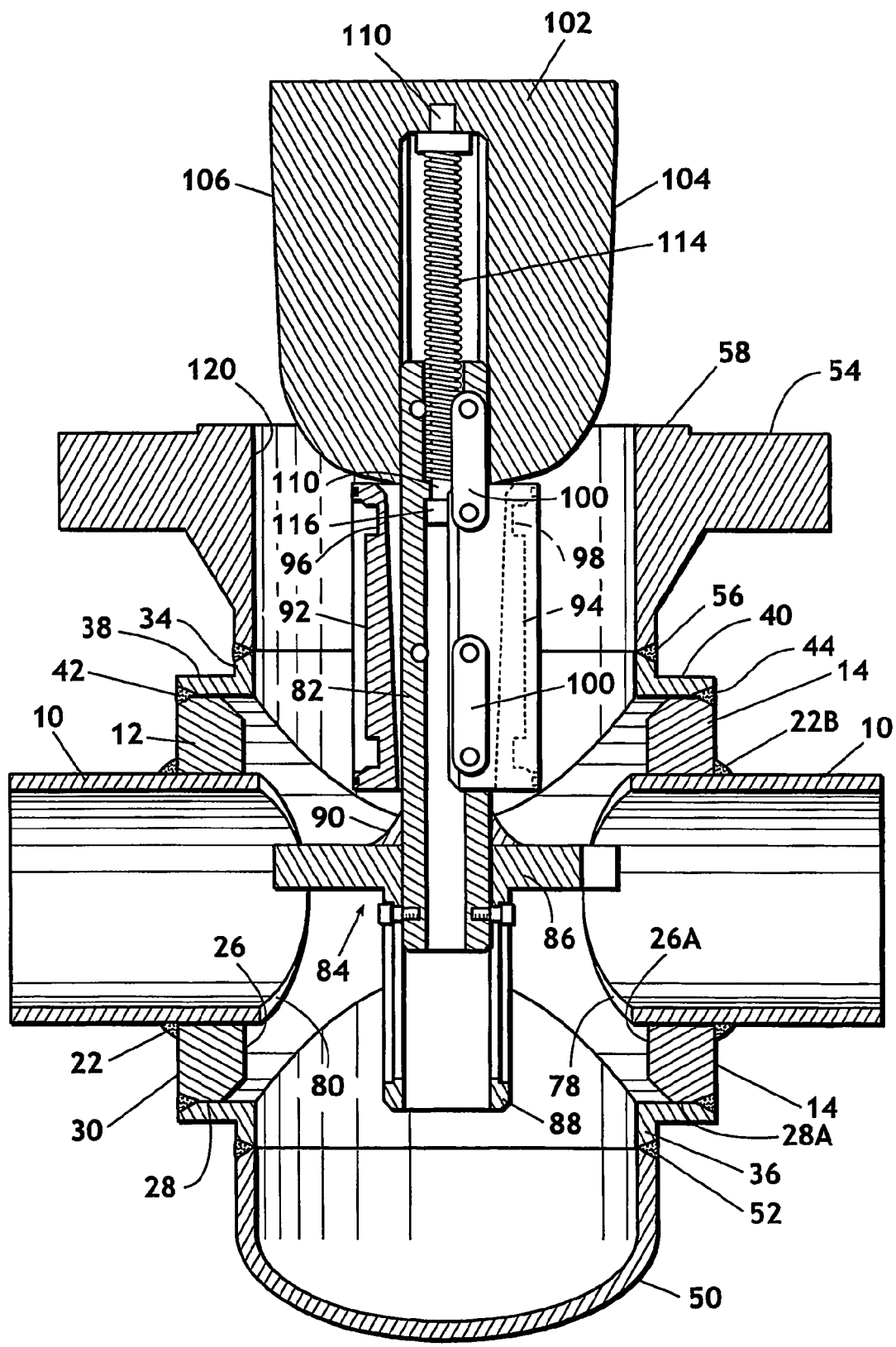
FIG. 5 shows a continuation of FIG. 4 in which the sealing system is being lowered into the containment housing.
Figure 6:
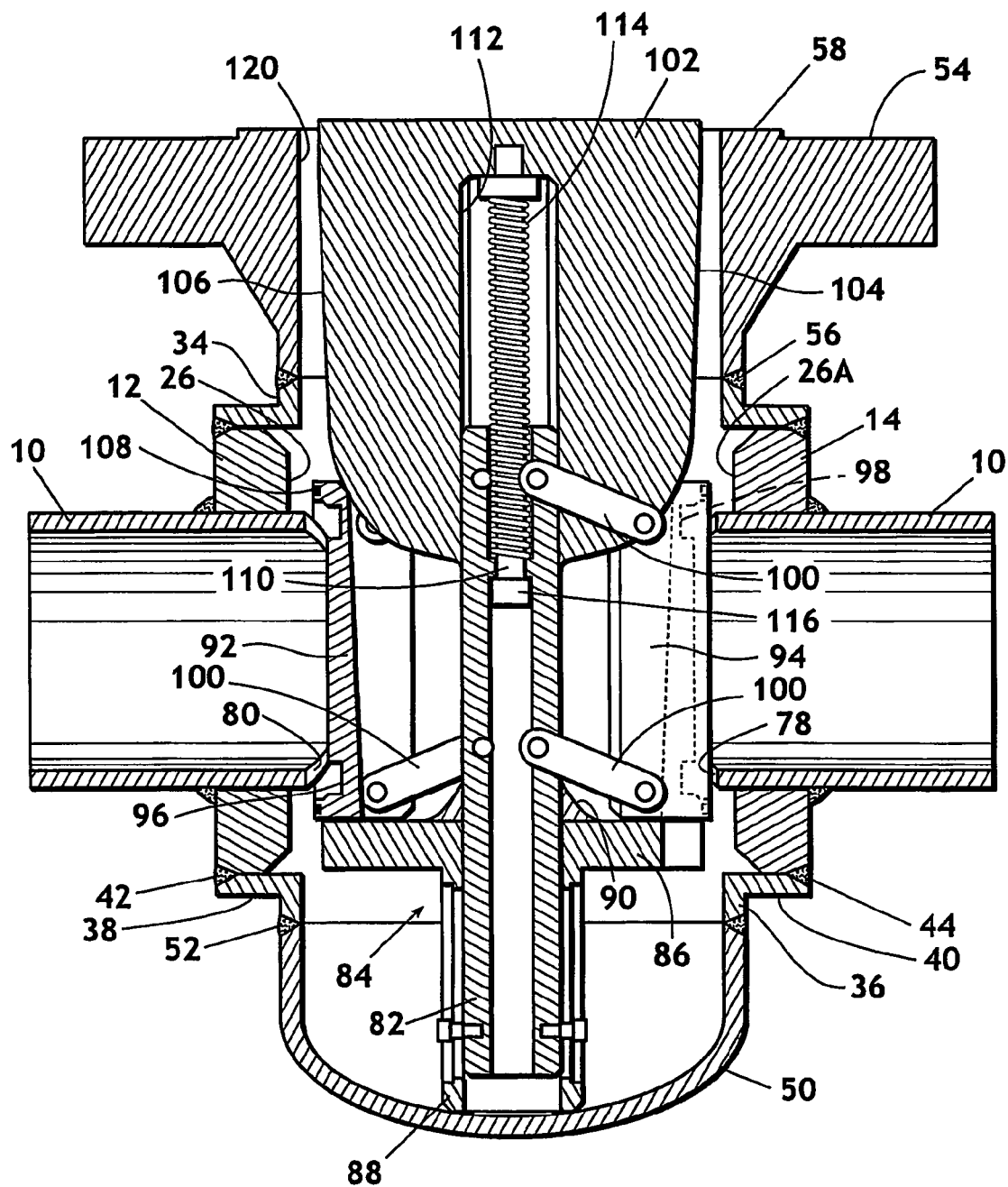
FIG. 6 shows the sealing system in place as it is operated to simultaneously extend two opposed sealing elements in towards the sealing surfaces that are provided by the opposed collars.

The next step in the method of the invention is to secure to the lower end of an extendable bar, such as boring bar 76 as seen in FIG. 8, a plugging mechanism consisting of a number of elements and parts that are shown most completely in FIGS. 6 and 7. FIGS. 4-7 show the sequence of the introduction of the plugging mechanism into the interior of the containment housing.

The plugging mechanism includes a tubular body 82. Slidably received on a lower end portion of tubular body 82 is a platform member generally indicated by the numeral 84 that has a radially extending flange-like platform 86. Platform 86 includes a frusto-conical portion 90 providing a tapering or guiding function as will be described subsequently. Secured to tubular body 82 is a first seal element 92 and a second seal element 94. Each of the seal elements has a forward face that is cup-shaped, that is, each of the seal elements has a forward face with an integral forwardly extending circumferential lip 96. The face inner portion (not seen) is of reduced thickness. Cup-shaped seal elements 92 and 94 are configured to fit over exposed pipe ends 78 and 80. This allows circumferential lip portion 96 of first seal element 92 to contact first flange sealing surface 26. In like manner, the circumferential lip 98 of second seal element 94 extends around and over end surface 78 of pipe 10 to contact sealing surface 26A of second collar 14.

Seal elements 92 and 94 are supported to plugging system tubular body 82 by means of multiple pivotal link arms indicated by the numeral 100. The linkage system includes a pair of link arms 100 at the upper end of each of the sealing elements 92 and 94 and a pair at the lower end of each of the seal elements so that thereby a total of eight link arms 100 is employed.

The sequence of operation of the link arms that control the positions of sealing elements 92 and 94 is illustrated in FIGS. 5-7. As shown in FIG. 5, sealing elements 92 and 94 are collapsed against tubular body 82 as the plugging system is lowered into the containment housing past upper flange 54. When the lower end of tubular portion 88 contacts the interior bottom surface of end cap 50, further downward travel of platform member 84 is terminated. As tubular body 82 moves telescopically downwardly within tubular portion 88 of platform member 84, the frusto-conical portion 90 on the upper surface of platform 86 is contacted to shift sealing elements 92 and 94 laterally outwardly away from each other as seen in FIG. 6. Telescopically received on the external surface of tubular body 82 is a wedge 102. Wedge 102 is affixed to the lower end of an extendable bar such as boring bar 76 seen in FIG. 8, but not shown in FIGS. 5-7. Wedge 102 has opposed slightly tapered outer cam surfaces 104 and 106. The surfaces 104 and 106 are slidably received in slots (not seen) in the rearward surface of first seal element 92 and second seal element 94. As wedge 102 is forced downwardly as progressively seen in FIGS. 5, 6 & 7, it forces sealing elements 92 and 94 away from each other and into sealing engagement with collar sealing surfaces 26 and 26A. There is thereby achieved metal-to-metal closure of each end of the severed pipe 10. The cup-shaped sealing elements 92 and 94 encompass the severed ends 80 and 82 of pipe 10. The short end portions of pipe 10 can, if needed, function as guides for sealing elements 92 and 94 so that they are maintained in alignment with sealing surfaces 26 and 26A as the sealing elements are forced outwardly first by linkage arms 100 and finally by the cam surfaces 104 and 106 of wedge 102.

As illustrated in FIGS. 5-7, each of the circumferential lip portions 96 and 98 of seal elements 92 and 94, respectively, may be provided with a circumferential slot that receives a circular sealing ring 108. This sealing ring is preferably formed of metal or if of non-metal then of a material that withstands the highest temperature to which it is subjected—that is, withstands the temperature equal to that of the fluid flow through pipe 10.

Tubular body 82 telescopically receives a rod 110 that extends downwardly from wedge 102. A slot 112 is provided in wedge 102 that receives rod 110. A spring 114 is positioned on rod 110 to apply a downward biasing force against tubular body 82. When tubular portion 88 contacts the interior surface of end cap 50, tubular body 82 slides upwardly on rod 110 thereby causing seal elements 92 and 94 to expand horizontally. As further downward movement of wedge 102 occurs, rod 110 moves downwardly within tubular body 82 compressing spring 114.

FIG. 7 shows wedge 102 fully or at least substantially fully received between opposed sealing elements 92 and 94 representing the maximum downward position of the plugging system. Wedge 102 remains in this position as long as it is necessary to close off flow through pipe 10.

With wedge 102 in its fully downward position and flow from one of the severed ends of pipe 10 closed off, a check for leakage can be made at the other end. By providing a small opening (not shown) in end cap 50 through which liquid could be drained and/or pressure measured, a means of determining whether or not both seal elements 92 and 94 have successfully and fully closed against inner faces 26 and 26A of collars 12 and 14 can be achieved. The ability to perform this function is commonly referred to in the industry as having a "block and bleed" capability.

To remove sealing contact of seal members with the collars, the sequence appearing in FIGS. 4-7 is reversed. First wedge 102 is moved upwardly removing pressure applied to the rearward surfaces of seal elements 92 and 94. Rod 110 moves within the interior of tubular body 82. Seal elements 92 and 94 remain in place as wedge 102 is initially moved upwardly since compressed spring 114 holds tubular body 82 downwardly as rod 110 first moves upwardly. Rod 110 has a head 116 at its lower end that when it engages an internal flange within the interior of tubular body 82, forces the tubular body upwardly. The linkage arms 100 then retract seal elements 92 and 94 allowing the entire plugging assembly to be removed from within the containment shell.

After the plugging assembly has been fully removed, the interior passageway 120 through flange 54 may be plugged using mechanisms that are not shown but that are commonly available in the industry such as a plugging device exemplified in U.S. Pat. No. 6,286,553, entitled "Removable Closure System" issued Sep. 11, 2001. Thereafter, the tapping and plugging system may be removed and top flange 54 may be closed with a flange plate and usage of pipe 10 can be then be resumed.

FIGS. 9 through 12 show the use of an alignment fixture generally indicated by the numeral 122 by which collars 12 and 14 are accurately positioned on the exterior of pipe 10 prior to welding the collars to the pipe. The alignment fixture forms a cradle for the collars. A first end plate 124 is secured by bolts 126 to outer face 30 of first collar 12. In like manner, bolts 128 hold second end plate 130 to the outer face 30A of collar 14.

End plates 124 and 130 are fixed with respect to each other by rods 132A, 132B, and 132C. Bolts 134 hold first end plate 124 to one end of the rods and, in like manner, bolts 136 hold second end plate 130 to the opposite rod ends. It is important that the lengths of rods 132A, B, and C be the same with very close tolerance, for two reasons. First, the length of the rods establishes the spacing between the inner faces 26 and 26A of the collars. Second, accurate uniformity of the lengths of rods 132A, 132B, and 132C ensures that the inner faces 26 and 26A are precisely parallel to each other.

Each of collars 12 and 14 is formed of two semi-toroid shaped pieces, as previously described. It is important that these two pieces of each collar fit together precisely, especially in the embodiment of the invention wherein the sealing faces 26 and 26A are not ground, machined, or polished in the field. For this purpose, two "drive lock," or sometimes known as "groove lock," pins 136 are used to accurately align the mating halves of each of collars 12 and 14. After pins 136 have been installed, bolts 138, two for each of the collars, are used to hold the collar halves together after the collars are assembled on pipe 10.

When collars 12 and 14 are installed on pipe 10 by use of alignment fixture cradle 122, the collars are tack welded to pipe 10 to securely anchor them in place. Thereafter, the alignment fixture cradle is removed and the rest of the welds completed as has been described.

The invention can be practiced using two separate methods. In one method, the inner faces 26 and 26A of collars 12 and 14 are accurately machined and ground after the collars are welded onto pipe 10. In a second method, the collars are precisely machined in a shop and precisely aligned as they are put together on pipe 10 utilizing an alignment cradle system as illustrated in and described with reference to FIGS. 9 through 12, in which case field grinding of the front faces 26 and 26A of the collars is not required.

The invention provides a unique system for closing fluid flow through a high temperature pipe without the necessity of draining the pipes and in a manner that no elastomeric or other temperature sensitive sealing materials are required.

While this invention has been described with a certain degree of particularity it is manifest that many changes may be made in the details of construction and the arrangement of component without departing from the spirit and scope of this disclosure.

What is claimed is:

1. A method of plugging a pipeline comprising the steps of:
    (a) welding onto the exterior of the pipeline first and second spaced apart collars, each collar having a sealing face in a plane perpendicular the pipeline axis;
    (b) affixing, by welding, a containment housing to said collars to fully encompass a section of the pipeline between said collars, the containment housing having an open top;
    (c) removably attaching a tapping machine to said containment housing in communication with said open top;
    (d) by use of said tapping machine, cutting and removing a length of the pipeline from between said collars leaving two open pipe ends;
    (e) positioning, by means of said tapping machine, first and second seal elements between said collars, each seal element having on a forward face a forwardly extending circumferential lip of internal diameter greater than the external diameter of the pipeline; and
    (f) moving said seal elements apart from each other to force each said circumferential lip into sealing engagement with a said collar sealing face closing said pipe.

2. A method of plugging a pipeline according to claim 1 wherein step (f) is carried out by first moving said seal elements apart from each other by linkages followed by forcing a wedge between said seal elements.

3. A method of plugging a pipeline according to claim 1 including, after step (a) of machining said sealing faces to provide an uninterrupted circumferential sealing surface on each said collar.

4. A method of plugging a pipeline according to claim 1 wherein in step (a) each said collar is in the form of two halves of a toroid, two halves being fitted around the pipeline to form each said collar, the halves of the collars being welded to the pipeline and to each other.

5. A method of plugging a pipeline according to claim 1 in step (b) said containment housing is formed of pieces that include, as an upper part, a flange having a passageway therethrough providing said open top.

6. A method of plugging a pipeline according to claim 5 wherein one of said containment housing pieces is an end cap forming a bottom part that is opposite of said flange.

7. A method of plugging a pipeline according to claim 1 wherein step (e) said first and second seal elements are each connected by sets of hinges to a tubular body said tubular body being longitudinally positionable on a vertical rod extending from said tapping machine.

8. A method of plugging a pipeline according to claim 7 including a platform member slideably positioned on the exterior of said tubular body, said platform member determining the lowermost position of said seal elements and aiding to guide said seal elements into sealing positions with respect to said collars sealing faces.

9. A method of plugging a pipeline according to claim 7 wherein said tubular body is downwardly sprung biased with respect to said vertical rod.

10. A method of plugging a pipeline according to claim 2 wherein each said seal element has on a rearward face a vertical slot slideably receiving an edge of said wedge.

11. A method of plugging a pipeline according to claim 1 wherein prior to the performance of step (a) an alignment fixture is affixed to said collars to hold said collars on the pipeline so that said sealing faces are in substantially accurate parallel planes perpendicular to the tubular axis of the pipeline and are spaced apart a substantially accurate predetermined distance, said alignment fixture being removable after initial welding fixes said collars relative to the pipeline.

12. A method according to claim 1 including between steps (b) and (c) of affixing a lower end of a valve having a closeable large bore passageway therethrough in closed communication with said containment housing open top, said tapping machine of step (c) being attachable to an upper end of said valve.

13. A method of plugging a pipeline according to claim 1 wherein step (d) is carried out with a circular saw of diameter greater than the diameter of the pipeline.

14. An assembly for use in a system for plugging a pipeline comprising:
    a first and a second toroidal collar each formed of a lower half semi-toroidal portion and a detachable mating upper half semi-toroidal portion, the portions when assembled having an internal circumferential surface of diameter substantially equal to the external diameter of the pipeline, each collar having on its inward face a plannar sealing surface and a rearward surface; and
    an alignment fixture having paralleled end plates spaced apart a substantially accurate predetermined distance, the end plates adapted for removable attachment to said rearward surfaces of said lower half semi-toroidal collar portions whereby said inner plannar sealing surfaces are accurately supported in paralleled and spaced apart positions and whereby said alignment fixture with said lower half semi-toroidal portion of each said collar may be positioned in contact with the pipeline and thereby ready to receive said upper half semi-toroidal portions.

15. An assembly for use in a system for plugging a pipeline according to claim 14 wherein said alignment fixture includes a plurality of equal length rods extending between and secured to said paralleled end plates serving to maintain said end plates at said substantially accurate predetermined distance.

16. Apparatus for use in a system for plugging a pipeline comprising:

a first and second toroidal collar each formed of a lower half semi-toroidal portion and a detachable mating upper half semi-toroidal portion, the portions when assembled having an internal circumferential surface of diameter substantially equal to the external diameter of the pipeline, each collar having on a forward face a planar sealing surface, said collars adaptable for fixation to the exterior of a pipeline and for receiving seal elements having circumferential sealing lip pressed against said planar sealing surfaces.

* * * * *